US012255901B2

(12) United States Patent
Rajasekharan et al.

(10) Patent No.: US 12,255,901 B2
(45) Date of Patent: Mar. 18, 2025

(54) IDENTIFYING AND TARGETING COMMUNICATION NETWORK EVENTS VIA UNIFORM RESOURCE LOCATOR SETS

(71) Applicant: AT&T Intellectual Property I, L.P., Atlanta, GA (US)

(72) Inventors: Vivek Rajasekharan, Plano, TX (US); Seyed Amir Mir Bagheri, Dallas, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 415 days.

(21) Appl. No.: 17/539,187

(22) Filed: Nov. 30, 2021

(65) Prior Publication Data

US 2023/0171269 A1    Jun. 1, 2023

(51) Int. Cl.
H04L 9/40            (2022.01)
(52) U.S. Cl.
CPC ............................... H04L 63/1416 (2013.01)
(58) Field of Classification Search
None
See application file for complete search history.

(56) References Cited

U.S. PATENT DOCUMENTS

| 6,411,725 | B1 * | 6/2002 | Rhoads | G06T 1/0028 |
| | | | | 707/E17.112 |
| 7,891,001 | B1 * | 2/2011 | Greenawalt | H04L 63/20 |
| | | | | 713/153 |
| 8,555,388 | B1 * | 10/2013 | Wang | H04L 69/22 |
| | | | | 713/188 |
| 10,516,687 | B1 * | 12/2019 | Ramamurthy | H04L 43/0882 |
| 10,936,462 | B1 * | 3/2021 | Eardley | G06F 11/0772 |
| 2009/0210921 | A1 * | 8/2009 | Ramsdell | H04N 21/26291 |
| | | | | 725/120 |

(Continued)

FOREIGN PATENT DOCUMENTS

| WO | WO0199325 | A2 * | 12/2001 | |
| WO | WO225460 | A1 * | 3/2002 | G06F 15/16 |
| WO | WO2012075336 | A1 * | 3/2012 | G06F 11/00 |

OTHER PUBLICATIONS

Gu, Guofei, et al. "Botminer: Clustering analysis of network traffic for protocol-and structure-independent botnet detection." (2008): 139. (Year: 2008).*

(Continued)

Primary Examiner — Paul R Fisher

(57) ABSTRACT

A processing system may track accessing of a plurality of uniform resource locators among users of a communication network, determine an occurrence of an event of an event type based upon an increased accessing of the plurality of uniform resource locators for at least one time period, identify a first sub-group of the users associated with the event, apply a first action in the communication network to a test group including at least a first portion of the first sub-group, the first action addressing a demand associated with the event of the event type, track at least a first success rate of the first action for the first portion of the first sub-group, and apply the first action to at least a second portion of the first sub-group in response to determining that the first success rate for the first portion of the first sub-group exceeds a threshold success rate.

20 Claims, 3 Drawing Sheets

(56) References Cited

U.S. PATENT DOCUMENTS

| | | | |
|---|---|---|---|
| 2012/0131139 A1* | 5/2012 | Siripurapu | H04L 65/60 709/217 |
| 2012/0158626 A1* | 6/2012 | Zhu | G06F 21/56 726/22 |
| 2013/0166527 A1* | 6/2013 | Kasterstein | G06F 16/16 707/706 |
| 2013/0198125 A1* | 8/2013 | Oliver | G06Q 30/0204 706/46 |
| 2014/0095412 A1* | 4/2014 | Agashe | G06F 16/24578 706/46 |
| 2015/0127789 A1* | 5/2015 | Lissack | H04L 41/0893 709/221 |
| 2015/0229661 A1* | 8/2015 | Balabine | H04L 63/1425 726/22 |
| 2015/0356582 A1* | 12/2015 | Turner, Jr. | H04L 67/52 705/7.34 |
| 2016/0094894 A1* | 3/2016 | Inayatullah | G06Q 30/0261 725/12 |
| 2017/0236160 A1* | 8/2017 | Oberoi | G06Q 30/0269 705/14.66 |
| 2020/0327395 A1 | 10/2020 | Simard | |

OTHER PUBLICATIONS

Shima, K., et al., "Classification of URL bitstreams using Bag of Bytes", Networking and Internet Architecture, Nov. 11, 2021.

Pykes, K., "The Vanishing/Exploding Gradient Problem in Deep Neural Networks", May 17, 2020, downloaded from https://towardsdatascience.com/the-vanishing-exploding-gradient-problem-in-deep-neural-networks-191358470c11.

* cited by examiner

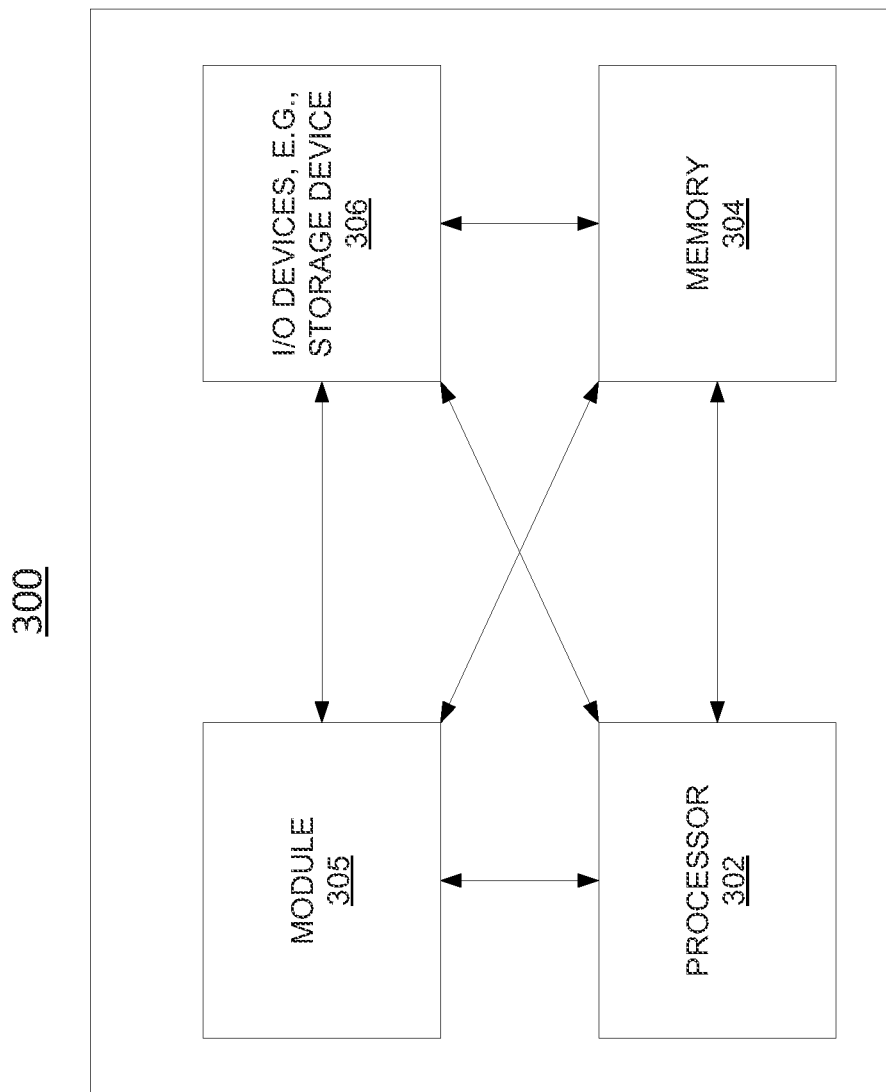

IDENTIFYING AND TARGETING COMMUNICATION NETWORK EVENTS VIA UNIFORM RESOURCE LOCATOR SETS

The present disclosure relates generally to communication network operations, and more particularly to methods, non-transitory computer-readable media, and apparatuses for applying an action in a communication network to a test group including a sub-group of users associated with an event of an event type determined based on an increased accessing of a plurality of uniform resource locators to address a demand associated with the event.

BACKGROUND

With billions of connected systems on the internet, users and consumers of communication network-based services regularly access uniform resource locators (URLs) (broadly "webpages") via browsers or other applications. However, with hundreds of millions of subscribers browsing even more numerous websites, it is difficult for machine learning models (MLMs) to learn from raw, voluminous, and complex URL histories.

SUMMARY

In one example, the present disclosure describes a method, computer-readable medium, and apparatus for applying an action in a communication network to a test group including a sub-group of users associated with an event of an event type determined based on an increased accessing of a plurality of uniform resource locators to addresses a demand associated with the event. For instance, a processing system including at least one processor deployed in a communication network may track accessing of a plurality of uniform resource locators among users of a communication network, determine an occurrence of an event of an event type based upon an increased accessing of the plurality of uniform resource locators for at least one time period, and identify a first sub-group of the users associated with the event. The processing system may then apply a first action in the communication network to a test group including at least a first portion of the first sub-group, the first action addressing a demand associated with the event of the event type, track at least a first success rate of the first action for the first portion of the first sub-group, and apply the first action to at least a second portion of the first sub-group in response to determining that the first success rate for the first portion of the first sub-group exceeds a threshold success rate.

BRIEF DESCRIPTION OF THE DRAWINGS

The teachings of the present disclosure can be readily understood by considering the following detailed description in conjunction with the accompanying drawings, in which:

FIG. 3 illustrates a high level block diagram of a computing device or system specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
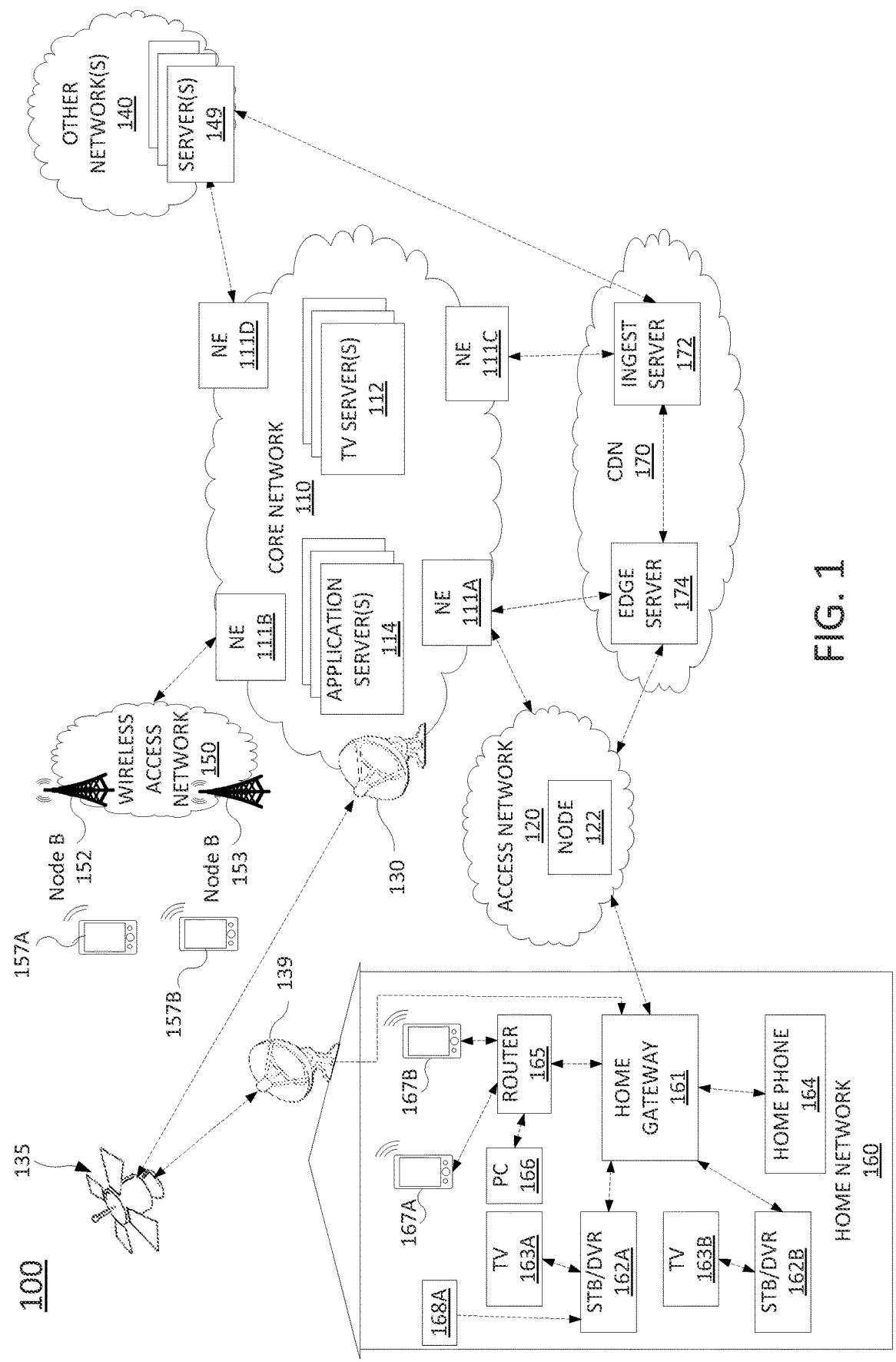
FIG. 1 illustrates an example network related to the present disclosure.

Examples of the present disclosure describe methods, computer-readable media, and apparatuses for applying an action in a communication network to a test group including a sub-group of users associated with an event of an event type determined based on an increased accessing of a plurality of uniform resource locators to address a demand associated with the event. With billions of connected systems on the internet, users and consumers of communication network-based services regularly access uniform resource locators (URLs) (broadly "webpages") via browsers or other applications. They have similar actions that they may take as a result of accessing webpages from site to site. These similar actions that lead to certain propensities can be utilized to compress not only the storage of sequences of URLs that may be accessed by a user, but also compress network traffic using behavior typing of similar combinations within historical URL sets. Additionally, this ensures that relevant URLs to a current topic of interest are stored, while other URLs may be discarded, and therefore data access is restricted to desired groups for privacy and security.

In one example, the present disclosure employs an assessment of URLs with anomalous behavior occurring at the same time to detect target events from browsing data. To illustrate, in one example, the present disclosure may identify trigger URLs (e.g., a set of URLs) that are most associated with a target behavior or category of users, e.g., users engaged in a fraudulent use of or in a communication network, users utilizing a particular network resource, users accessing a particular data content or a type of data content, users changing endpoint devices or network access equipment, and so on. The present disclosure may then track/counts user visits to/accessing of trigger URLs over a rolling time window, such as two weeks, one month, two months, etc. In addition, the present disclosure may identify days (or other time periods) with anomalously high visitor count to these trigger URLs to identify occurrences of events associated with the trigger URL set and target category of users. For example, if a current day sees a spike in visitor count for multiple URLs in the set, a new event may have occurred. In one example, the greater the number of visitors to these anomalous URLs and/or the greater number of URLs in the set having increased levels of access, the greater the confidence in determining that an event has occurred.

In accordance with the present disclosure, an event may be an event that may drive increased accessing of the set of URLs and which may be associated with a particular behavior and/or target category of users. For instance, an event may include a new data content of a type of data content (e.g., an upcoming release of a new movie or show, an upcoming new sporting event video program or an upcoming new concert video program, etc.), a botnet activity, a mass gathering event (e.g., an upcoming live sporting event, concert, etc.), a device update (e.g., a software or firmware update, an operating system update, etc.), a new game release (e.g., an entirely new game, or a new feature of an existing game (e.g., a major new feature, such as a new world, a new season, etc.)), or the like. In one example, the visitors to anomalous URLs in connection with an event may be further identified by the type of event and/or characteristics/demographics/locations of the visitors (e.g., ages 18-54 versus 55 and older, or the location is Florida versus California) to identify category-specific event details. In addition, particular sub-groups of the users/visitors driving the increased accessing of the set of URLs in connection with an event may provide a generalization to broader groups of users and/or other sub-groups with similar features.

In one example, the present disclosure may include a historical URL sequence database, which may record user interactions on the web (on a per-user and/or per-device basis), such as URLs selected in a sequence. In one example, the present disclosure may also analyze historical URL sequences and determine representative URLs related to a certain target category, or categories, e.g., users associated with the fraudulent use of the communication network, users associated with a utilization of a network resource of the communication network, users associated with an accessing of a particular data content or a type of data content via the communication network, users associated with a change in endpoint devices, network access equipment, or network service providers, etc. For instance, the present disclosure may measure a probability of a URL being visited by known members of the target category, and then compare to a probability of visiting that URL by known non-members of the target category. The present disclosure may then determine a ratio of visits by members of the target category to visits by non-members of the target category for each URL, and score/rank URLs based on this ratio. In one example, the ratios may be modified to account for standard deviation, errors, etc. After determining scores for all URLs, the present disclosure may then rank/order the URLs by score, and may select to keep a top "N" number of URLs by score/rank, URLs that exceed a threshold score, a top "N" percent of URLs, etc. In various examples, the number or percent of URLs to keep and/or the threshold score to be selected are based upon different considerations, such as a desired number of URLs to keep, a prediction accuracy, etc.

Notably, previously unknown sources may be uncovered and included in a set of target URLs for a category. For instance, seemingly "immaterial" or "irrelevant" URLs may have no indication of the subject matter/content, e.g., URLs of a cloud provider domain followed by random characters. However, these URLs may redirect or may be associated with other domains that may be relevant to the target category. Furthermore, examples of the present disclosure may implement network load balance based on knowledge of a number of users in a target sub-category or sub-group, their locations, device types, network utilization at different times-of-day, days of the week, etc. Similarly automatic software defined network (SDN) network resource instantiation and/or allocation may be adapted based on this information learned in accordance with the present disclosure. These and other aspects of the present disclosure are described in greater detail below in connection with the examples of FIGS. 1-3.

To better understand the present disclosure, FIG. 1 illustrates an example network 100, related to the present examples. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device (or "user endpoint device") configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a fiber access network, a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. It should be noted that the foregoing are only several examples of the types of relevant application servers 114 that may be included in core network 110 for storing information relevant to providing various services to users.

Figure 2:
FIG. 2 illustrates a flowchart of an example method for applying an action in a communication network to a test group including a sub-group of users associated with an event of an event type determined based on an increased accessing of a plurality of uniform resource locators to addresses a demand associated with the event.

Application servers 114 may also represent a processing system for applying an action in a communication network to a test group including a sub-group of users associated with an event of an event type that is determined based on an increased accessing of a plurality of uniform resource locators, to address a demand associated with the event. For instance, one or more of the application servers 114 may each comprise a computing device or processing system, such as computing system 300 depicted in FIG. 3, and may be configured to individually or collectively perform one or more steps, functions, or operations for applying an action in a communication network to a test group including a sub-group of users associated with an event of an event type that is determined based on an increased accessing of a plurality of uniform resource locators, to address a demand associated with the event. For instance, an example method for applying an action in a communication network to a test group including a sub-group of users associated with an event of an event type that is determined based on an increased accessing of a plurality of uniform resource locators, to address a demand associated with the event is illustrated in FIG. 2 and described below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 3 and discussed below) or multiple computing devices collectively configured to perform various steps, functions, and/or operations in accordance with the present disclosure.

In accordance with the present disclosure, other networks 140 and servers 149 may comprise networks and devices of various content providers of webpages, documents, videos, or other content items. In one example, servers 149 may represent "origin servers" which may originate content that may be stored in and distributed via content distribution network (CDN) 170. In this regard, the content from servers 149 that may be stored in and distributed via content distribution network (CDN) 170 may include webpages, documents, audio programs, video programs, e.g., movies, television shows, video news programs, sports video content, and so forth, as well as video advertisements.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions comprise a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end users, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth.

As mentioned above, TV servers 112 in core network 110 may also include one or more interactive TV/video-on-demand (VoD) servers and/or network-based DVR servers. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client video player. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve a manifest file for the video from one or more of application servers 114 and provide the manifest file to STB/DVR 162A. STB/DVR 162A may then obtain one or more portions of the video from one or more network-based servers, such as one of the TV servers 112, edge server 174 in CDN 170, and so forth, as directed via the manifest file. For instance, URL(s) and other information that may be used by a player device to request and obtain chunks of adaptive or non-adaptive bitrate video may be stored in the manifest file which may be obtained by the player device in advance of a streaming session.

To illustrate, the manifest file may direct the STB/DVR 162A to obtain the video from edge server 174 in CDN 170. The edge server 174 may already store the video (or at least a portion thereof) and may deliver the video upon a request from the STB/DVR 162A. However, if the edge server 174 does not already store the video, upon request from the STB/DVR 162A, the edge server 174 may in turn request the video from an origin server. The origin server which stores the video may comprise, for example, one of the servers 149 or one of the TV servers 112. The video may be obtained from an origin server via ingest server 172 before passing the video to the edge server 174. In one example, the ingest server 172 may also pass the video to other middle tier servers and/or other edge servers (not shown) of CDN 170. The edge server 174 may then deliver the video to the STB/DVR 162A and may store the video until the video is removed or overwritten from the edge server 174 according to any number of criteria, such as a least recently used (LRU) algorithm for determining which content to keep in the edge server 174 and which content to delete and/or overwrite. It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining videos (e.g., the video chunks thereof) from edge server 174 of CDN 170 in accordance with corresponding URLs in the manifest file.

As mentioned above, one or more of the application servers 114 may represent a processing system for applying an action in a communication network to a test group including a sub-group of users associated with an event of an event type that is determined based on an increased accessing of a plurality of uniform resource locators, to address a demand associated with the event. To illustrate, application server(s) 114 may collect URLs visited, browsed, accessed, or otherwise selected by various endpoint devices, such as mobile devices 157A, 157B, 167A, and 167B, and/or PC 166. For instance, selected URLs may be accessed via web browsers or other applications ("apps") of such devices, including social networking applications, map applications, gaming applications, productivity applications, calendar and scheduling applications, and so forth. In one example, application server(s) 114 may collect URLs associated with usage of STBs/DVRs 162A and 162B, TV 163A, and/or TV 163B (e.g., URLs related to video and/or video chunk selections, URLs related to accessing of programming information via a television programming guide or the like, URLs accessed via browsers of TVs 163A and 163B (e.g., smart TVs), etc.). The URLs may be associated with communication sessions between such endpoint devices and various network-based devices, devices reachable via access network 120, wireless access network 150, core network 110, CDN 170, other networks 140, etc., such as servers 149, edge server 174, and TV servers 112.

In one example, the collections of URLs (e.g., URL histories) may be obtained from the endpoint devices directly. For instance, the endpoint devices may be configured, with permission/consent of the users and/or the device owners, to collect and report on a URL history for each respective device. Alternatively, or in addition, URL histories of various endpoint devices and/or the users thereof may be obtained from one or more network-based devices or processing systems, such as network elements 111A-111D, edge server 174, TV servers 112, and/or any other such device(s) that may be within a communication path. For instance, such network-based devices may generate a record of a communication by source and/or destination IP address, along with the URL and a timestamp. Again, the collection and usage of such users' URL activities will require the users' consent. Alternatively, the collection and usage of such users' URL activities can be performed in the aggregate where identifying information of each user is anonymized, e.g., the aggregated user activity information may simply indicate that 50,000 users visited a particular URL on a particular day of the year, but the identities of the users are not gathered or disclosed.

In addition to collecting URL histories, application server(s) 114 may also store information regarding various users being associated with various target categories, such as users associated with fraudulent use of the communication network, users associated with a utilization of a network resource of the communication network, users associated with an accessing of a particular data content or a type of data content via the communication network, users associated with a change in the endpoint devices, network access equipment, network service providers, etc. In one example, application server(s) 114 may then identify, for a particular target category, those URLs that are most associated with the target category (e.g., a URL set or "target URL set"). For instance, application server(s) 114 may measure a probability of a URL being visited by known members of the target category, and then compare that to a probability of visiting that URL by known non-members of the target category. Application server(s) 114 may then determine a ratio of visits by members of the target category to visits by non-members of the target category for each URL, and score/rank URLs based on this ratio. In one example, the ratios may be modified to account for standard deviation, errors, etc. After determining scores for all URLs, application server(s) 114 may then rank/order the URLs by score, and may select to keep a top "N" number of URLs by score/rank, URLs that exceed a threshold score, a top "N" percent of URLs, etc. In various examples, the number or percent of URLs to keep and/or the threshold score to be selected are based upon different considerations, such as a desired number of URLs to keep, a prediction accuracy, and so forth.

In one example, application server(s) 114 may then monitor, or track visits to/accessing of URLs in target URL sets. For instance, URL visits may be obtained from the endpoint devices directly or may be obtained from one or more network-based devices or processing systems, such as described above. Application server(s) 114 may then determine an occurrence of an event of an event type based upon an increased accessing of URLs in a target URL set for at least one time period. For instance, the at least one time period may be an hour, a day, or other time periods. For example, if a current day sees a spike in visitor count for multiple URLs in the set, a new event may have occurred. In one example, the greater the number of visitors to these URLs and/or the greater number of URLs in the set having increased levels of access, the greater the confidence in determining that an event has occurred. In one example, a certain level of increased accessing may be indicative of the event. For instance, an event may be determined to have occurred when the increased accessing comprises at least one standard deviation above a moving average of a measure of the accessing of URLs in the target URL set over a plurality of time periods (or 1.5 standard deviations, 2 standard deviations, etc.). For instance, the at least one time period may comprise a day, and the plurality of time periods may comprise at least 14 days, 30 days, 60 days. Alternatively, or in addition, the event may be determined to have occurred when the increased accessing comprises a measure of accessing of the URLs in the target URL set for the at least one time period that is at least 30 percent above a moving average of a measure of the accessing of the URLs over a plurality of time periods, at least 40 percent above the moving average, at least 50 percent above the moving average, etc.

The URLs of the target URL set may be associated with a target behavior or category of users, e.g., users engaged in a fraudulent use of or in a communication network, users utilizing a particular network resource, users accessing a particular data content or a type of data content, users changing endpoint devices, network access equipment, network service providers, and so on. In accordance with the present disclosure, an event may be an event that may drive increased accessing of the set of URLs and which may be associated with a particular behavior and/or target category of users. For instance, an event may include a new data content of a type of data content (e.g., an upcoming new movie or show release, an upcoming new sporting event video program or an upcoming new concert video program, etc.), a botnet activity, a mass gathering event (e.g., an upcoming live sporting event, concert, etc.), a device update (e.g., a software or firmware update, an operating system update, etc.), a new game release (e.g., an entirely new game, or a new feature of an existing game, (e.g., a major new feature, such as a new world, a new season, etc.)), or the like.

To illustrate, an event may be a major press release regarding an upcoming device update, network update, or the like, which may cause a number of users to purchase and utilize new devices (e.g., a new laptop computer, a new mobile smart phone, etc.). For instance, a device update or network update may be expected to obsolete certain older devices, which may cause a number of users to seek new, state-of-the-art devices (or at least more current devices). Notably, this activity may be preceded or accompanied by visits to URLs in a target set of URLs associated with the target category of "users changing endpoint devices or network access equipment." Similarly, an upcoming release of a new model of a flagship phone may be preceded by a public announcement of the pending release of the product by the manufacturer, which may precipitate a substantial increase in visits to URLs in a target URL set associated with a category of "users who purchase new models of phone type X." In this case, the increased accessing of the URLs in the target URL set may cause application server(s) 114 to identify that an event, e.g., major new press release and/or advertising campaign, has occurred. Other examples may relate to a botnet operator initiating operations to commence a denial of service attack (e.g., an event), which may cause a large increase in visits to URLs associated with botnet command and control operations (e.g., URLs associated with users/endpoint devices of a category "members of a botnet").

In any of the foregoing cases, application server(s) 114 may also apply at least one action in the network 100 responsive to an identification of at least a first sub-group of the users of the communication network associated with a detected event (e.g., as identified by an increased accessing of the URLs associated with the target category and/or events of the event type). In one example, the at least one action applied in the network 100 may address a demand associated with the event of the event type. In addition, the at least one action may be applied to a test group including at least a first portion of the first sub-group of the users. For instance, application server(s) 114 may track the numbers and/or percentages of users in different demographic sub-groups accessing the URLs in the URL set during the given time period. Application server(s) 114 may then identify the sub-group, or sub-groups which is/are driving the increased accessing during the time period. For instance, application server(s) 114 may identify that a first sub-group of users comprises a demographic category of users having devices that are detected as accessing at least one of the plurality of URLs via the tracking. In one example, the first sub-group may comprise a demographic sub-group of users having the greatest number and/or percentage of accesses of URLs in the set of URLs. In one example, application server(s) 114 may identify one or more sub-groups having a quantity of access or a percentage of accessing of the URLs in the URL set above a threshold, may identify a top several sub-groups of users driving the increase in accessing of the URLs in the URL set in the given time period, and so on.

In one example, one or more sub-groups may be identified at a level of granularity based upon a minimum size requirement for a sub-group being identified, e.g., at least 100,000 users, at least 50 percent of the users driving the increase in accessing of the URLs in the URL set in the given time period, and so forth. In one example, each of a plurality of demographic factors may comprise a constraint on the sub-groupings which may be added or released to provide a particular level of granularity. For instance, users of ages 18-55 in Florida having phone model Z may be a sub-group identified at a particular level of granularity. The demographic constraints may be: (1) ages=18-55, (2) location=Florida, and/or (3) phone model=Z. A higher level of granularity may be achieved by releasing or changing the location parameter, e.g., all users of ages 18-55 having phone model Z, or all users of ages 18-55 in southeastern United States having phone model Z. Similarly, a lower level of granularity may be achieved by adding or changing a demographic constraint, e.g., users of ages 18-55 in Florida having phone model Z and who are on prepaid service plans, or users of ages 18-55 in Palm Beach County, Florida having phone model Z.

Thus, in any case, after identifying one or more sub-groups driving an increase in accessing of URLs in a URL set associated with an event of an event type (and/or associated with a given target category of users), application server(s) 114 may apply at least one action in the network 100 responsive to an identification of the one or more sub-groups. For instance, application server(s) 114 may provide, to at least one recipient computing system, the identifications of the one or more sub-groups, e.g., the demographic constraints defining the sub-group(s), the number of members of the sub-group(s) identified as accessing one or more of the URLs in the URL set in the given time period, a percentage of the members of the sub-group(s) identified as accessing one or more of the URLs in the URL set in the given time period as compared to a total number of users known to be within the sub-group, the percentage to which a particular sub-group or sub-groups has/have driven an increased accessing of URLs in the URL set in the given time period (e.g., "50 percent increase in access on Dec. 10 contributed by sub-group N," or "50 percent increase in access on Dec. 10 contributed by sub-group N and 25 percent increase in access on Dec. 10 contributed by sub-group M" or the like), and so forth. The application server(s) 114 may provide such information in the form of a notification or a report, a table, a spreadsheet, or a chart, a map, which may indicate a geographic distribution of users (or endpoint devices) who are (and/or are not) part of an identified sub-group, and so on. The at least one recipient computing system may comprise an endpoint device of a network operations personnel, or may comprise one or more additional automated computing systems.

In one example, application server(s) 114 may also represent a self-optimizing network (SON)/software defined network (SDN) controller that may function as a self-optimizing network (SON) orchestrator that is responsible for activating and deactivating, allocating and deallocating, and otherwise managing a variety of network components. For instance, application server(s) 114 may activate and deactivate antennas/remote radio heads of wireless access network 150, may steer antennas/remote radio heads of wireless access network 150 (e.g., adjusting vertical tilt angles, azimuth bearings, beamwidths, power levels, and or other settings), may allocate or deallocate (or activate or deactivate) baseband units in a BBU pool, may add (or remove) one or more network slices, and may perform other operations for adjusting configurations of components of wireless access network 150 in accordance with the present disclosure.

In one example, application server(s) 114 may represent an SDN controller that is responsible for instantiating, configuring, managing, and releasing VNFs to perform the functions of routers, switches, and other devices, provisioning routing tables and other operating parameters for the VNFs, and so forth. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes. Accordingly, application server(s) 114 representing an SDN controller may be connected directly or indirectly to any one or more network elements of core network 110, and of the network 100 in general.

It is again noted that in one example, application server(s) 114 may apply at least one action in the network 100 to address a demand associated with the event of the event type. In addition, the at least one action may be applied to a test group including at least a first portion of the first sub-group of the users. Thus, in one example, at least one action in the network responsive to identifying the one or more sub-groups driving an increase in accessing of URLs in a URL set associated with an event of an event type (and/or associated with a given target category of users) may comprise application server(s) 114 allocating at least one additional resource of the communication network or removing at least one existing resource of the communication network, such as providing an additional content server or removing an existing content server, adding an additional network firewall or removing an additional network firewall, and so on (e.g., to a test group including at least a first portion of the first sub-group of the users). In one example, the at least one action in the network may alternatively or additionally comprise re-routing at least a portion of traffic in a selected portion of the network, e.g., to the test group. For instance, if a new firewall is added or an existing firewall is removed, application server(s) 114 may update routing tables or other traffic flow mechanisms to send network traffic to such a new firewall, or to redirect network traffic from a firewall that is being deactivated/removed to a different firewall, and so on.

Similarly, in one example, the at least one action in the network may comprise load-balancing at least a portion of network traffic in the selected portion of the communication network. For instance, the identified sub-group(s) may be indicative of a demand prediction for a particular content or type of content from users in a particular geographic zone, users having a particular endpoint device type, etc. Thus, application server(s) 114 may be tasked with distributing user requests for such a content item to different content servers based upon the anticipated demand. For instance, some users (e.g., their respective endpoint devices) may be equally served by two content servers, whereas endpoint devices of other users may be in locations or have equipment that otherwise can only be served by one of the content servers. Accordingly, application server(s) 114 may reserve capacity of one of the content servers for those users who cannot be redirected elsewhere, while directing other users/endpoint devices to the alternate content server.

In one example, the at least one action in the network may include offloading at least a portion of traffic in a selected portion of the network, e.g., based upon anticipated/predicted demand, application server(s) 114 may offload a portion of traffic in the selected portion of the network before it is overloaded. In still another example, the at least one action in the network may include applying a denial-of-service mitigation measure in the selected portion of the network, e.g., blocking, slowing, or redirecting selected flows or connections, etc. For instance, the target category may be a fraudulent use of the network, and the identified one or more sub-groups may indicate a large number of users/endpoint devices (e.g., endpoint devices of a particular type) are or will be engaged in a botnet, or the like. For example, these endpoint devices may have URL sequences indicative of connecting to command and control servers to obtain instructions for a denial of service attack, indicative of attempted connections to a domain being attacked, etc.

It is again noted that in one example, the at least one action may initially be applied by application server(s) 114 to a test group including at least a first portion of a first sub-group of the users. In one example, application server(s) 114 may track a success rate of the first action for the first portion of the first sub-group. For instance, the success rate of the first action for the first portion of the first sub-group may be determined from a number of users of the first portion of the first sub-group that are tracked to access or not access a network resource within a given time period (which may relate to a level of success in enticing users to utilize the network resource or conversely in preventing users from accessing the network resource, or slowing a rate of accessing the network resource). Alternatively, or in addition, the success rate may be determined from user feedback solicited by application server(s) 114 from users of the first portion of the first sub-group. For instance, application server(s) 114 may transmit SMS messages or the like to endpoint devices of various users in the portion of the sub-group with a query such as: "Was this helpful? Reply: Yes/No," or "Would you recommend this? Reply: Yes/No."

In one example, application server(s) 114 may apply the first action to at least a second portion of the first sub-group in response to determining that the first success rate for the first portion of the first sub-group exceeds a threshold success rate. Alternatively, or in addition, in response to determining that the first success rate for the first portion of the first sub-group exceeds a threshold success rate, application server(s) 114 may also apply the first action to a least a first portion of a second sub-group characterized by at least one demographic constraint being removed or changed as compared to the first sub-group (e.g., as described above). However, in another example, the test group may alternatively or additionally include a least a first portion of a second sub-group characterized by at least one demographic constraint being removed or changed as compared to the first sub-group. In such an example, application server(s) 114 may also track a second success rate of the first action for the at least the first portion of the second sub-group. In addition, application server(s) 114 may apply the first action to at least a second portion of the second sub-group in response to determining that the second success rate for the first portion of the second sub-group exceeds the threshold success rate.

In one example, application server(s) 114 may also provide, to at least one recipient computing system, the first success rate of the first action for the first portion of the first sub-group (and/or a second success rate of the first action for a first portion of a second sub-group etc.). In one example, application server(s) 114 may further receive an instruction from the at least one recipient computing system to apply the first action to the at least a first portion of the second sub-group (e.g., if not included in the initial test group), where application server(s) 114 may then apply the first action to the at least the first portion of the second sub-group in response to the instruction.

Further details regarding the functions that may be implemented by application servers 114, mobile devices 157A, 157B, 167A, and 167B, PC 166, TV servers 112, servers 149, edge server 174, ingest server 172, STBs/DVRs 162A and 162B, TV 163A, and/or TV 163B, are discussed in greater detail below in connection with the example of FIG. 2. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates a flowchart of a method 200 for applying an action in a communication network to a test group including a sub-group of users associated with an event of an event type that is determined based on an increased accessing of a plurality of uniform resource locators, to address a demand associated with the event, in accordance with the present disclosure. In one example, the method 200 is performed by one or more of application server(s) 114 of FIG. 1, or any one or more components thereof, such as a processing system, or by one of these devices in conjunction with other devices and/or components of network 100 of FIG. 1, such as edge server 174, ingest server 172, NEs 111A-111D, etc. In one example, the steps, functions, or operations of method 200 may be performed by a computing device or system 300, and/or a processing system 302 as described in connection with FIG. 3 below. For instance, the computing device or system 300 may represent any one or more components of the network 100 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, and each instance may represent one of the application servers 114, edge server 174, ingest server 172, TV servers 112, and so forth in FIG. 1. For illustrative purposes, the method 200 is described in greater detail below in connection with an example performed by a processing system, such as processing system 302. The method 200 begins in step 205 and proceeds to step 210.

At step 210, the processing system tracks accessing of a plurality of uniform resource locators (URLs) among users of a communication network. In one example, the plurality of URLs may be associated with an event of an event type. In addition, the plurality of URLs may be associated with a target category of users of the communication network. For instance, in one example, the plurality of URLs may be determined to be associated with the event of the event type by, for each respective URL of the plurality URLs: determining a percentage of users known to be of the target category having the respective URL in URL histories of the percentage of users. The processing system may then generate a score for the respective URL based upon the percentage of users known to be of the target category having the respective URL in the URL histories of the percentage of users. In addition, in one example, a respective URL is selected to be included in the plurality of URLs when the score for such URL exceeds a threshold.

In one example, the plurality of URLs may be determined to be associated with the event of the event type further by, for each respective URL of the plurality of URLs, determining a second percentage of users known to not be of the target category having the respective URL in URL histories of the second percentage of users known to not be of the target category. In such an example, the score may be generated further based upon the second percentage of users known to not be of the target category having the respective URL in the URL histories of the second percentage of users. In other words, the score for a particular URL may also be based upon percentage of users who are not in the category who also visit the URL. For instance, the score may be a ratio of the percentage of users who are in the category who visit the URL to the percentage of users who are not in the category who also visit the URL, a percentage of users who are in the category who visit the URL to a total number of users who visit the URL, etc. In another example, the score may be a ranking of the respective uniform resource locator by any of the above metrics in relation to other URLs. In such case, a threshold for selecting a URL to be included in the plurality of uniform resource locators associated with the target category may be a top N number of URLs, a top N percent of URLs in relation to all URLs considered, or the like. In one example, the threshold is set based upon a defined maximum number of the plurality of URLs associated with the target category, e.g., the top 200-1000 URLs ranked by score indicating the URLs most associated with the target category.

In various examples, the target category may comprise users associated with a utilization of a network resource of the communication network, users associated with an accessing of a particular data content or a type of data content via the communication network, users associated with fraudulent use of the communication network, users associated with a change in network access equipment or network service providers (e.g., users changing mobile endpoint devices, set-top boxes, gateways, routers, or network service providers, e.g., different cellular carriers, and so on). Thus, in addition to being associated with events of the event type, the plurality of URLs is also associated with a target category of users.

In another example, the plurality of URLs may be identified by determining a percentage of users known to be of the target category having the respective string in respective URL histories. For example, strings within a URL "www.example.com/february/2021" may comprise: "www," "example," "com," "Feb.," and "2021." The processing system may then generate a score for the respective string based upon the percentage of users known to be of the target category having the respective string in the respective URL histories. Some strings may be relatively non-informative, such as "www," while others may be more informative, such as "Feb." and "2021." In such an example, the processing system may further, for each respective URL of the plurality of URLs associated with the target category: identify strings within the respective URL and generate a score for the respective URL comprising a combination of scores of the strings within the respective URL. For instance, in such case, the respective URL may be selected to be included in the plurality of URLs associated with the target category when the score of the respective URL exceeds a threshold, such as discussed above. In one example, the processing system may, for each respective string, determining a second percentage of users known to not be of the target category having the respective string in respective URL histories. In such an example, the score for the respective string may be generated further based upon the second percentage of users known to not be of the target category having the respective string in the respective URL histories.

At step 215, the processing system determines an occurrence of an event of an event type based upon an increased accessing of the plurality of URLs for at least one time period in accordance with the tracking of step 210. For instance, the plurality of URLs may be associated with events of the event type (and associated with a target category of users), as described above. In one example, the increased accessing may comprise at least one standard deviation above a moving average of a measure of the accessing of the plurality of URLs over a plurality of time periods, e.g., across all users and/or accesses of the plurality of URLs that are tracked. In one example, the increased accessing may alternatively or additionally comprise a measure of accessing of the plurality of URLs for the at least one time period that is at least 40 percent above a moving average of a measure of the accessing of the plurality of URLs over a plurality of time periods, or at least 50 percent above the moving average, etc. For instance, the at least one time period may comprise a day, and the plurality of time periods may comprise at least 14 days, 30 days, 60 days.

The event of the event type may include a new data content of a type of data content (e.g., an upcoming new movie or show release, an upcoming new sporting event video program or an upcoming new concert video program, etc.), a botnet activity, a mass gathering event (e.g., an upcoming live sporting event, concert, etc.), a device update (e.g., a software or firmware update, an operating system update, etc.), a new game release (e.g., an entirely new game, or a new feature of an existing game, (e.g., a major new feature, such as a new world, a new season, etc.)), or the like.

At step 220, the processing system identifies at least a first sub-group of the users of the communication network associated with the event (e.g., associated with the increased accessing of the plurality of URLs for the at least one time period, and hence, associated with the event detected thereby). In one example, the first sub-group of users may comprise a demographic category of users having devices that are detected as accessing at least one of the plurality of URLs via the tracking. Thus, in one example, the tracking of step 210 may include tracking on a per-user basis, e.g., and then aggregating over users in various demographic groups to identify at least the first sub-group, etc. In one example, the first sub-group may comprise a demographic sub-group of users having the greatest number and/or percentage of accesses of URLs in the set of URLs. In one example, step 220 may identify one or more sub-groups having a quantity of access or a percentage of accessing of the plurality of URLs above a threshold, may identify a top several sub-groups of users driving the increase in accessing of the plurality of URLs for the at least one time period, or the like. In one example, one or more sub-groups may be identified at a level of granularity based upon a minimum size requirement fora sub-group being identified, e.g., at least 100,000 users, at least 50 percent of the users driving the increase in accessing of the plurality of URLs in the at least one time period, and so forth.

At step 225, the processing system applies a first action in the communication network to a test group including at least a first portion of the first sub-group of the users, where the first action addresses a demand associated with the event of the event type. In one example, the test group may further include at least a first portion of a second sub-group, where the second sub-group is characterized by at least one demographic constraint being removed or changed as compared to the first sub-group (e.g., as described above). In accordance with step 225, the at least one action may comprise at least one of: re-routing at least a portion of network traffic in a selected portion of the communication network, load-balancing at least a portion of network traffic in the selected portion of the communication network, offloading at least a portion of network traffic in the selected portion of the communication network, applying a denial-of-service mitigation measure in the selected portion of the communication network, or the like. In one example, step 225 may alternatively or additionally comprise at least one of: allocating at least one additional resource of the communication network responsive to the event of the event type or removing at least one existing resource of the communication network responsive to the event of the event type. In one example, an additional resource that may be added or an existing resource that may be removed (e.g., deactivated and/or deallocated) may be a hardware component of the network, or may be provided by hardware, e.g., bandwidth on a link, line card, router, switch, or other processing nodes, a CDN storage resource, a VM and/or a VNF, etc. Similarly, the additional resource may be a caching of a primary content, or a secondary content that is similar or related to the primary content associated with the target category that is predicted to be in demand at one or more future time periods and in one or more geographic locations and/or network regions. Similarly, the first action may comprise an offer of a new network service feature, an upgraded network service feature, a reduced cost for an existing network service feature, a new item of hardware to access the network service feature, and so on.

At step 230, the processing system tracks at least a first success rate of the first action for the first portion of the first sub-group. In one example, step 230 may further include tracking a second success rate of the first action for the at least the first portion of the second sub-group (e.g., in an example in which the at least the first portion of the second sub-group is included in the test group at step 225). In one example, the first success rate may be determined from a number of users of the first portion of the first sub-group that are tracked to access or not access a network resource within a given time period (which may relate to a level of success in enticing users to utilize the network resource, or conversely in preventing users from accessing the network resource or at least slowing a rate of accessing the network resource). The network resource can include the bandwidth in cellular access or other wireless access links (or other network bandwidths), one or more servers (e.g., web servers of one or more websites, Domain Name System (DNS) servers, application servers for various network services, cloud storage servers and/or database systems, etc.), one or more media content items (e.g., a movie program, sporting event, program concert program, etc. that is broadcast or accessed via a streaming service), a customer service number (e.g., calls to a help-desk, etc.), and so forth. Alternatively, or in addition, the success rate may be determined from user feedback solicited by the processing system from users of the first portion of the first sub-group. For instance, the processing system may transmit SMS messages or the like to endpoint devices of various users in the portion of the sub-group with a query such as: "Was this helpful? Reply: Yes/No," or "Would you recommend this? Reply: Yes/No."

At step 235, the processing system may apply the first action to at least a second portion of the first sub-group in response to determining that the first success rate for the first portion of the first sub-group exceeds a threshold success rate. In one example, step 235 may include applying the first action to at least a second portion of the second sub-group in response to determining that the second success rate for the first portion of the second sub-group exceeds the threshold success rate (e.g., in an example in which the at least the first portion of the second sub-group is included in the test group at step 225). For instance, when the first action is deemed successful with respect to any of the portion(s) of sub-group(s) in the test group, the first action may be expanded to apply to the entire or at least additional portion(s) of the sub-group(s). For example, if the first sub-group comprises users of ages 18-55 in Florida with device type Z and includes 250,000 users, the test group may include 25,000 users selected from among this sub-group. When success is identified at step 230 with regard to this portion of the first sub-group, the first action may then be applied to a next 25,000 users in the first sub-group, e.g., for a next day, a next week, etc., and so on in additional portions of the first sub-group until all users/members of the first sub-group have the first action applied. In another example, the first solution may be rolled-out to all remaining members/users of the first sub-group when the success is determined a step 230 (e.g., at or around the same time, instead of in batches). In an example in which the at least the first portion of the second sub-group is included in the test group at step 225 and success is also determined in accordance with the second success rate at step 230, step 235 may include a similar application of the first solution to remaining members/users of the second sub-group (and so on with respect to other sub-groups having portions of users included in the test group with success determined at step 230). It should be noted that step 235 may comprise the same or similar operations as step 225 (however, with respect to the at least the second portion of the first sub-group).

At optional step 240, the processing system may provide, to at least one recipient computing system, the first success rate of the first action for the first portion of the first sub-group. The first success rate may be provided in the form of a notification or a report, a table, a spreadsheet, or a chart, a map, which may indicate a geographic distribution of users (or endpoint devices) who are (and/or are not) part of an identified sub-group, and so on. The at least one recipient computing system may comprise an endpoint device of a network operations personnel, or may comprise one or more additional automated computing systems. The notification or report may be provided via text message, email, an eXtensible Markup Language (XML) document, or the like and transmitted by the processing system to the at least one recipient computing system via the communication network.

At optional step 245, the processing system may receive an instruction from the at least one recipient computing system to apply the first action to at least a first portion of a second sub-group (e.g., where the second sub-group is not represented in the initial test group at step 225). For instance, the instruction may be received from the at least one recipient computing system via any of the modalities mentioned above in connection with step 240, or the like. To illustrate, a network operations personnel or automated computing system may determine that the first action should be rolled-out, e.g., applied, to additional sub-groups or other demographic categories of users and/or their endpoint devices in the communication network based upon the success rate(s) for the test group overall and/or with respect to one or more sub-groups represented in the test group.

At optional step 250, the processing system may apply the first action to at least a first portion of a second sub-group, where the second sub-group is characterized by at least one demographic constraint being removed or changed as compared to the first sub-group (e.g., as described above). In one example, optional step 250 may be performed in response to an instruction that may be received at optional step 245. It should be noted that optional step 250 may comprise the same or similar operations as step 225 and/or step 235 (however, with respect to the at least the first portion of the second sub-group).

At optional step 255, the processing system may track a second success rate of the first action for the at least the first portion of the second sub-group. For example, optional step 255 may comprise the same or similar operations as step 230 (but with respect to the at least the first portion of the second sub-group).

At optional step 260, the processing system may apply the first action to a least a second portion of the second sub-group, in response to determining that the second success rate for the first portion of the second sub-group exceeds the threshold success rate. For instance, optional step 260 may comprise the same or similar operations as any of step 225, step 235, or optional step 250 (but with respect to the at least the second portion of the second sub-group).

Following step 235, or any of optional steps 240-260, the method 200 may proceed to step 295, where the method 200 ends. However, in one example, following step 235, optional step 250, or optional step 260, the method 200 may return to step 210 and subsequent steps of the method 200 may be repeated to identify a new event, apply an action to a test group to address a demand associated with the event, and so forth.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-235, steps 210-250, or steps 210-260, as noted above. In one example, step 250, or steps 250-260 may be repeated for one or more additional iterations/cycles, e.g., for additional sub-groups. In one example, the additional sub-groups may be characterized by additional demographic constraints being removed or changed as compared to the first sub-group and/or as compared to the second sub-group, etc. In one example, additional iterations may cease when success rates do not achieve the threshold success rate/level for subsequent sub-groups. In one example, the additional iterations/cycles may comprise a rollout of the first action following a geographic pattern, e.g., east to west. For instance, an event may be detected with respect to a sub-group with one or more demographic constraints defining the sub-group to be users in the eastern United States. In one example, the event may be applicable to other regions but may not yet be detected via the URL visit data. For example, days for users in the east may start earlier than for those in the west, and thus, certain events may be detected earlier with respect to one or more sub-groups constrained to the east coast. Nevertheless, the first action may be extended to additional sub-groups of users east-to-west, e.g., via optional steps 250-260, etc., in advance of more direct detection of the event being associated with these sub-groups.

In one example, optional step 250 may be performed in the absence of optional steps 240 and 245. For example, the applying of the first action may be automatically extended to the first portion of the second sub-group upon the success with the first portion of the first sub-group, e.g., without input from management personnel. In one example, the method 200 may further include steps of identifying the plurality of URLs associated with the event of the event type (and in one example, also being associated with the target category of users). In one example, the event may be an announcement of a new data content (e.g., a new movie or the like) and the first action may comprise allocating of at least one additional resource of the communication network, which may include providing an access to a new data content via a server of the communication network (e.g., instead of via a competitor streaming platform). In one example, the first action may comprise deallocating of at least one existing resource of the communication network, such as slowing traffic by changing settings of one or more routers to prevent botnet activity or to prevent overloading of access to new media content (e.g., reducing maximum bandwidth, reducing queue size or number of packet processing queues, turning off, deactivating or making line cards unavailable, etc.). In one example, the event may be a new upcoming sporting event for Team X, the target category may be users who attend sporting events of Team X, and the first action may be to transition cell coverage for an area around and including a stadium or arena of Team X.

In another example, the first action may comprise incentivizing access at later time, such as providing a discount to watch new movie on the day after an initial release, a second day after release, etc., e.g., instead of accessing the new movie on the release day. In still another example, the event can be an offer for competitive communication service, the URLs may be associated with users who drop service with the communication network, and the first action at step 225 can be communicating an incentive to continue service with the communication network, such as offering a subscription discount, a free or subsidized endpoint device, free or discounted premium content, and so forth. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the system 300. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for applying an action in a communication network to a test group including a sub-group of users associated with an event of an event type that is determined based on an increased accessing of a plurality of uniform resource locators, to address a demand associated with the event, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for applying an action in a communication network to a test group including a sub-group of users associated with an event of an event type that is determined based on an increased accessing of a plurality of uniform resource locators, to address a demand associated with the event (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for applying an action in a communication network to a test group including a sub-group of users associated with an event of an event type that is determined based on an increased accessing of a plurality of uniform resource locators, to address a demand associated with the event (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   tracking, by a processing system deployed in a communication network, accessing of a plurality of uniform resource locators among users of the communication network;
   determining, by the processing system, an occurrence of an event of an event type based upon an increased accessing of the plurality of uniform resource locators for at least one time period in accordance with the tracking;
   identifying, by the processing system, at least a first sub-group of the users of the communication network associated with the event;
   applying, by the processing system, a first action in the communication network to a test group including at least a first portion of the first sub-group of the users, wherein the first action addresses a demand associated with the event of the event type;
   tracking, by the processing system, at least a first success rate of the first action for the first portion of the first sub-group, wherein the first sub-group of the users comprises a demographic category of users having devices that are detected as accessing at least one of the plurality of uniform resource locators via the tracking, the demographic category of users associated with a plurality of demographic constraints, wherein the plurality of demographic constraints comprises at least a device type constraint;
   applying, by the processing system, the first action to at least a second portion of the first sub-group in response to determining that the first success rate for the first portion of the first sub-group exceeds a threshold success rate; and
   applying, by the processing system, the first action to a least a first portion of a second sub-group of the users in response to determining that the first success rate for the first portion of the first sub-group exceeds the threshold success rate, wherein the second sub-group is characterized by at least one demographic constraint of the plurality of demographic constraints being removed or changed as compared to the first sub-group, wherein the at least one demographic constraint being removed or changed comprises the device type constraint.

2. The method of claim 1, wherein the test group includes a least a first portion of a third sub-group, wherein the third sub-group is characterized by at least a second demographic constraint being removed or changed as compared to the first sub-group.

3. The method of claim 2, wherein the tracking of the at least the first success rate comprises tracking a second success rate of the first action for the at least the first portion of the third sub-group.

4. The method of claim 3, wherein the applying the first action to the at least the second portion of the first sub-group includes applying the first action to at least a second portion of the second sub-group in response to determining that the second success rate for the first portion of the third sub-group exceeds the threshold success rate.

5. The method of claim 1, further comprising:
   tracking a second success rate of the first action for the at least the first portion of the second sub-group; and
   applying the first action to a least a second portion of the second sub-group, in response to determining that the second success rate for the first portion of the second sub-group exceeds the threshold success rate.

6. The method of claim 1, wherein the increased accessing comprises at least one standard deviation above a moving average of a measure of the accessing of the plurality of uniform resource locators over a plurality of time periods.

7. The method of claim 1, wherein the increased accessing comprises a measure of accessing of the plurality of uniform resource locators for the at least one time period that is at least 30 percent above a moving average of a measure of the accessing of the plurality of uniform resource locators over a plurality of time periods.

8. The method of claim 1, wherein the plurality of uniform resource locators comprises a set of uniform resource locators associated with the event of the event type.

9. The method of claim 1, wherein the plurality of uniform resource locators is determined to be associated with the event of the event type by, for each respective uniform resource locator of the plurality of uniform resource locators:
   determining a percentage of the users known to be of a target category having the respective uniform resource locator in uniform resource locator histories of the percentage of users; and
   generating a score for the respective uniform resource locator based upon the percentage of users known to be of the target category having the respective uniform resource locator in the uniform resource locator histories of the percentage of users, wherein the respective uniform resource locator is selected to be included in the plurality of uniform resource locators when the score exceeds a threshold.

10. The method of claim 9, wherein the plurality of uniform resource locators is determined to be associated with the event of the event type further by, for each respective uniform resource locator of the plurality of uniform resource locators:
    determining a second percentage of users known to not be of the target category having the respective uniform resource locator in uniform resource locator histories of the second percentage of the plurality of users known to not be of the target category, wherein the score is generated further based upon the second percentage of users known to not be of the target category having the respective uniform resource locator in the uniform resource locator histories of the second percentage of users.

11. The method of claim 9, wherein the threshold is set based upon a defined maximum number of the plurality of uniform resource locators associated with the target category.

12. The method of claim 1, wherein the plurality of uniform resource locators is associated with a target category of users.

13. The method of claim 12, wherein the target category comprises:
    users associated with a utilization of a network resource of the communication network;
    users associated with an accessing of a particular data content or a type of data content via the communication network;
    users associated with a fraudulent use of the communication network;

users associated with a change in network access equipment; or users associated with a change in service of a network service provider.

14. The method of claim 1, wherein the event type comprises:
a new data content of the type of data content;
a botnet activity;
a mass gathering event;
a device update; or
a new game release.

15. The method of claim 1, wherein the first action comprises:
re-routing at least a portion of traffic in a selected portion of the communication network;
load-balancing at least a portion of traffic in the selected portion of the communication network;
offloading at least a portion of traffic in the selected portion of the communication network;
allocating at least one additional resource of the communication network responsive to the event of the event type;
removing at least one existing resource of the communication network responsive to the event of the event type; or
applying a denial-of-service mitigation measure in the selected portion of the communication network.

16. The method of claim 1, wherein the first success rate of the first action for the first portion of the first sub-group is determined from at least one of:
a number of users of the first portion of the first sub-group that are tracked to access or not access a network resource within a given time period; or
user feedback solicited from users of the first portion of the first sub-group.

17. An apparatus comprising:
a processing system including at least one processor; and
a computer-readable medium storing instructions which, when executed by the processing system when deployed in a communication network, cause the processing system to perform operations, the operations comprising:
tracking accessing of a plurality of uniform resource locators among users of the communication network;
determining an occurrence of an event of an event type based upon an increased accessing of the plurality of uniform resource locators for at least one time period in accordance with the tracking;
identifying at least a first sub-group of the users of the communication network associated with the event;
applying a first action in the communication network to a test group including at least a first portion of the first sub-group of the users, wherein the first action addresses a demand associated with the event of the event type;
tracking at least a first success rate of the first action for the first portion of the first sub-group, wherein the first sub-group of the users comprises a demographic category of users having devices that are detected as accessing at least one of the plurality of uniform resource locators via the tracking, the demographic category of users associated with a plurality of demographic constraints, wherein the plurality of demographic constraints comprises at least a device type constraint;
applying the first action to at least a second portion of the first sub-group in response to determining that the first success rate for the first portion of the first sub-group exceeds a threshold success rate; and applying the first action to a least a first portion of a second sub-group of the users in response to determining that the first success rate for the first portion of the first sub-group exceeds the threshold success rate, wherein the second sub-group is characterized by at least one demographic constraint of the plurality of demographic constraints being removed or changed as compared to the first sub-group, wherein the at least one demographic constraint being removed or changed comprises the device type constraint.

18. A non-transitory computer-readable medium storing instructions which, when executed by a processing system including at least one processor when deployed in a communication network, cause the processing system to perform operations, the operations comprising:
tracking accessing of a plurality of uniform resource locators among users of the communication network;
determining an occurrence of an event of an event type based upon an increased accessing of the plurality of uniform resource locators for at least one time period in accordance with the tracking;
identifying at least a first sub-group of the users of the communication network associated with the event;
applying a first action in the communication network to a test group including at least a first portion of the first sub-group of the users, wherein the first action addresses a demand associated with the event of the event type;
tracking at least a first success rate of the first action for the first portion of the first sub-group, wherein the first sub-group of the users comprises a demographic category of users having devices that are detected as accessing at least one of the plurality of uniform resource locators via the tracking, the demographic category of users associated with a plurality of demographic constraints, wherein the plurality of demographic constraints comprises at least a device type constraint;
applying the first action to at least a second portion of the first sub-group in response to determining that the first success rate for the first portion of the first sub-group exceeds a threshold success rate; and
applying the first action to a least a first portion of a second sub-group of the users in response to determining that the first success rate for the first portion of the first sub-group exceeds the threshold success rate, wherein the second sub-group is characterized by at least one demographic constraint of the plurality of demographic constraints being removed or changed as compared to the first sub-group, wherein the at least one demographic constraint being removed or changed comprises the device type constraint.

19. The non-transitory computer-readable medium of claim 18, wherein the increased accessing comprises at least one standard deviation above a moving average of a measure of the accessing of the plurality of uniform resource locators over a plurality of time periods.

20. The non-transitory computer-readable medium of claim 18, wherein the increased accessing comprises a measure of accessing of the plurality of uniform resource locators for the at least one time period that is at least 30 percent above a moving average of a measure of the accessing of the plurality of uniform resource locators over a plurality of time periods.

\* \* \* \* \*